United States Patent [19]

Williams

[11] Patent Number: 5,314,551
[45] Date of Patent: May 24, 1994

[54] TIRE PITCH SEQUENCING FOR REDUCED TIRE TREAD NOISE

[75] Inventor: Thomas A. Williams, North Canton, Ohio

[73] Assignee: General Tire, Inc., Akron, Ohio

[21] Appl. No.: 792,006

[22] Filed: Nov. 14, 1991

[51] Int. Cl.[5] .............................................. B60C 11/11
[52] U.S. Cl. ................................................. 152/209 R
[58] Field of Search ......................... 152/209 R, 209 D

[56] References Cited

U.S. PATENT DOCUMENTS

| | | |
|---|---|---|
| 2,255,994 | 9/1941 | Bush . |
| 2,808,867 | 10/1957 | Buddenhagen et al. ........ 152/209 R |
| 2,878,852 | 3/1959 | Lippmann et al. . |
| 3,023,798 | 3/1962 | Moore et al. . |
| 3,926,238 | 12/1975 | Vorih . |
| 4,474,223 | 10/1984 | Landers . |
| 4,721,141 | 1/1988 | Collette et al. . |
| 4,936,364 | 6/1990 | Kajiwara et al. . |

FOREIGN PATENT DOCUMENTS 0004501  1/1989  Japan ................. 152/209 R

*Primary Examiner*—Michael W. Ball
*Assistant Examiner*—Nancy T. Krawczyk
*Attorney, Agent, or Firm*—Calfee, Halter & Griswold

[57] ABSTRACT

A tire with reduced tire noise includes a tread having a plurality of base pitches placed about the circumference of the tire in at least one circumferential section. According to one aspect of the invention, the base pitches have three different pitch lengths which form a pitch sequence around the circumference of the tire in each circumferential section. The base pitches are arranged such that the transitions between the base pitches with the smallest pitch lengths to the base pitches with the largest pitch lengths are between about 15% and 30% of the total number of transitions between base pitches of different lengths in the pitch sequence. Additionally, the smallest and largest base pitches each comprise between about 35% and 40% of the total number of base pitches around the circumference of the tire. The above factors, when coupled with no more than three consecutive base pitches having the same pitch length being arranged adjacent one another, provide a tread with reduced tire noise.

5 Claims, 5 Drawing Sheets

TIRE SEGMENT SEQUENCE : A

PITCH LENGTH   $p^1=1.0$   $p^2=1.158$   $p^3=1.298$
               $p^4=1.493$   $p^5=1.623$

PITCH SEQUENCE : A

```
3 1 3 1 1 5 3 2 2 2 3 3 2 2 2 4
4 3 5 3 1 4 1 1 5 5 2 3 1 1 1
2 1 3 1 2 3 5 1 1 2 2 4 3 3 2
5 5 5 4 3 3 3 4 1 1 4 4 1 1 1
4 5 2 5 5 5 2 5 1 4 2 3 3 2 5 5
2 2 5 5 1 5 1 2 5 5 5 5 1 3
```

PITCH DISTRIBUTION:  L1=23  L2=18  L3=17  L4=10  L5=20

TIRE PITCH SEQUENCING FOR REDUCED TIRE TREAD NOISE

The present invention relates generally to tire treads, and more particularly to a technique for reducing tire tread noise by selectively arranging the base pitches in certain pitch sequences around the circumference of the tire.

BACKGROUND OF THE INVENTION

The tread of a modern tire is typically divided into a plurality of raised, load-supporting tread blocks separated by intersecting circumferential and transverse grooves and/or sipes. The tread blocks determine the control, acceleration and braking characteristics of the tire, while the grooves and/or sipes are necessary to provide flexibility and water removal.

The tread blocks are typically arranged in "base pitches", wherein each base pitch includes a predetermined geometry of whole and/or partial tread blocks. Each base pitch may vary in width across the tire. For example, each base pitch may extend transversely from one shoulder to the other shoulder of the tire, or it may extend transversely over only a single circumferential section of the tire, for example over a single rib or combination of ribs. In any case, the base pitches are repeated around the circumference of the tire to form the complete tire tread.

The constant contact of the tire tread on the road surface tends to produce unwanted noise. In particular, as the tire contacts the road surface, the individual tread blocks cause air disturbances upon impact with the road, creating a spectrum of audio frequencies broadly referred to as "tire noise". Tire noise is generated at least in part by: (1) the impact of the tread block on the road surface; (2) the vibration of the tire carcass; and (3) the "air pumping" which occurs as the tread blocks become compressed and expand into the grooves separating adjacent blocks. The fundamental frequency of the noise is a function of the number of tread blocks around the circumference of the tire and the rotational speed of the tire.

Techniques have been developed to distribute the noise frequency produced by the tire tread over a wide frequency band to approach what is termed "white noise". One known technique for reducing tread noise is to use base pitches having different pitch lengths, wherein the "pitch length" is a measure of the length from the leading edge of one base pitch to the leading edge of the next adjacent representative base pitch in the circumferential direction of the tire. A plurality of base pitches having different pitch lengths is conventionally referred to as a "pitch sequence".

For example, Lippman et al U.S. Pat. No. 2,878,852, discloses a tire tread having male and female mold halves, wherein each mold half has a separate pitch sequence extending around the circumference of the tire. Lippman discloses a pitch sequence which is represented by the series of relative circumferential distances: 9 10 11 12 10 11 12 13 12 11 10 9 11 12 13 10 10 13 12 11 9 10 11 12 13 12 11 10 12 11 10 9. These circumferential distances represent the relative circumferential length of successive tread units expressed in any desired measuring unit. In Lippman the tread units are selected to be mirror images of themselves or of other groups in each respective mold half.

Other techniques use random or sinusoidal sequencing of the pitches in an attempt to modulate the objectionable noise producing frequencies. For example, Vorih, U.S. Pat. No. 3,926,238, discloses a technique for modulating tread noise by providing discrete pitch lengths in which the ratio of pitch lengths falls within the open intervals defined by the boundary nodal points $(N-1)/N:1.0$, (N being an integer selected from 2, 3, 4, 5 or 6), and excluding the ratios defined by the boundary nodal points. Further modulation is obtained by sequencing the individual pitches in such a manner that the sequence is characterized by a plurality of strings of load carrying elements, each string consisting of at least three consecutive load carrying elements of substantially identical pitch length. The length and sequential positioning of the strings are selected to modulate the block frequency harmonic which is produced upon rotation of the tire.

Similarly, Landers, U.S. Pat. No. 4,474,223, discloses a method for reducing tire noise by spreading the noise generated by the tire tread over a broad frequency spectrum by:

i selecting the maximum number of repeating design cycles which may be placed about the apparatus;
  ii. selecting a maximum pitch ratio;
  iii. determining the appropriate number of harmonic segments in which the apparatus may be divided into in accordance with the following equation:

$$NS = [NP \times (LP-SP)]/[B \times (LP+SP)]$$

where
  NS is the required number of harmonic sequence
  NP is the number of pitches (design cycles)
  LP is the longest pitch length
  SP is the shortest pitch length
  B is the modulation index;
  iv. determining the size of each of the harmonic segments and the number of design cycles for each of the harmonic segments; and
  v. arranging the different design cycle lengths in each of the harmonic segments so that the wave length of the predominant modulation frequency of the harmonic segment corresponds to the fundamental length of that segment.

Accordingly, the above references disclose certain pitch sequences which are designed to reduce noise produced by tire treads by varying the pitch length of the tread blocks around the circumference of the tire to spread the noise over a broad frequency band. However, there is a constant demand in the industry for general techniques for selectively arranging base pitches in pitch sequences around the circumference of the tire to reduce the noise of the tire tread contacting the road surface.

SUMMARY OF THE INVENTION

The present invention provides a new and useful technique for reducing the noise produced by tire treads, and in particular provides a new and useful technique for selectively arranging the base pitches in certain pitch sequences around the circumference of the tire to reduce the noise of the tire tread contacting the road surface.

According to one aspect of the present invention, the tire tread includes a plurality of base pitches placed around the circumference of the tire in at least one circumferential section. The plural base pitches have three different pitch lengths and each base pitch includes at least one load-supporting tread block. The tread blocks are separated by circumferential and transverse grooves and/or sipes.

The tread noise is reduced by selectively arranging the base pitches in a pitch sequence such that the transitions between the base pitches with the smallest pitch lengths to the base pitches with the largest pitch lengths are between about 15% to 30% of the total number of transitions between base pitches of different lengths in the pitch sequence. Moreover, the base pitches with the smallest and largest pitch lengths each comprise between about 35% and 40% of the total number of base pitches around the circumference of the tire. Finally, no more than three consecutive base pitches having the same pitch length are arranged adjacent one another in the pitch sequence.

Arranging the base pitches in a pitch sequence according to the above technique distributes the noise frequency produced by the tire tread over a wide frequency band and thereby reduces the noise of the tire on the road surface.

Accordingly, it is a basic object of this invention to provide a general technique for reducing the noise produced by a tire tread on a road surface by selectively arranging the base pitches in certain pitch sequences around the circumference of the tire.

Further objects of the present invention will become further apparent from the following detailed description and the accompanying drawings.

DETAILED DESCRIPTION OF THE PREFERRED EMBODIMENT

Figure 1:
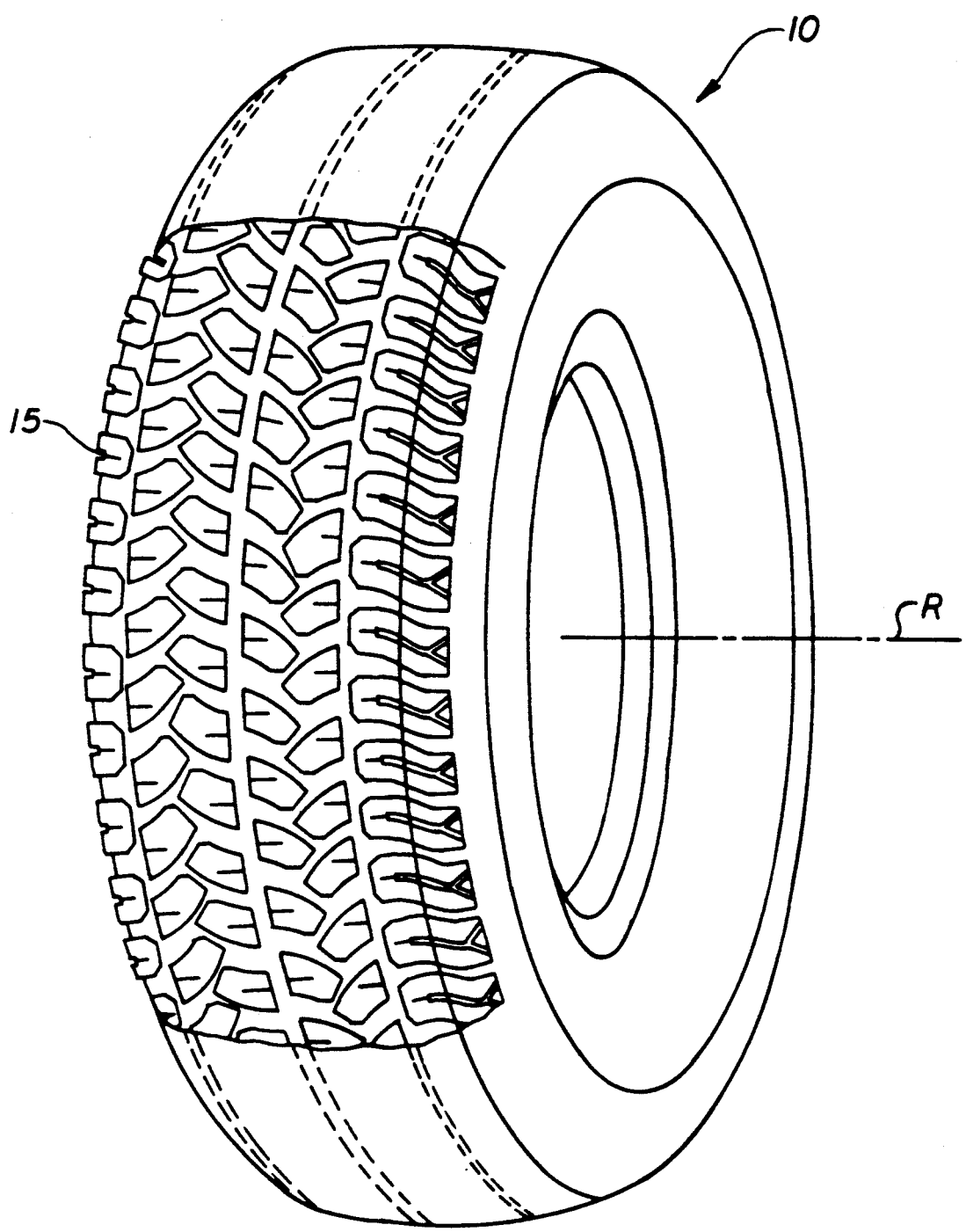
FIG. 1 is a perspective view of a tire having a tread made in accordance with the present invention.

Referring to the drawings, and initially to FIG. 1, a tire, indicated generally at 10, preferably includes a tire tread, indicated generally at 15. The tire is adapted to rotate around an axis R. According to the preferred form of the invention, the tire is preferably a radial tire, however, the present invention is not limited to any particular tire type; rather the invention is appropriate for any type of tire having a tread. In any case, the techniques for manufacturing and forming the tire are known to those skilled in the tire art and will not be discussed herein.

Figure 2:
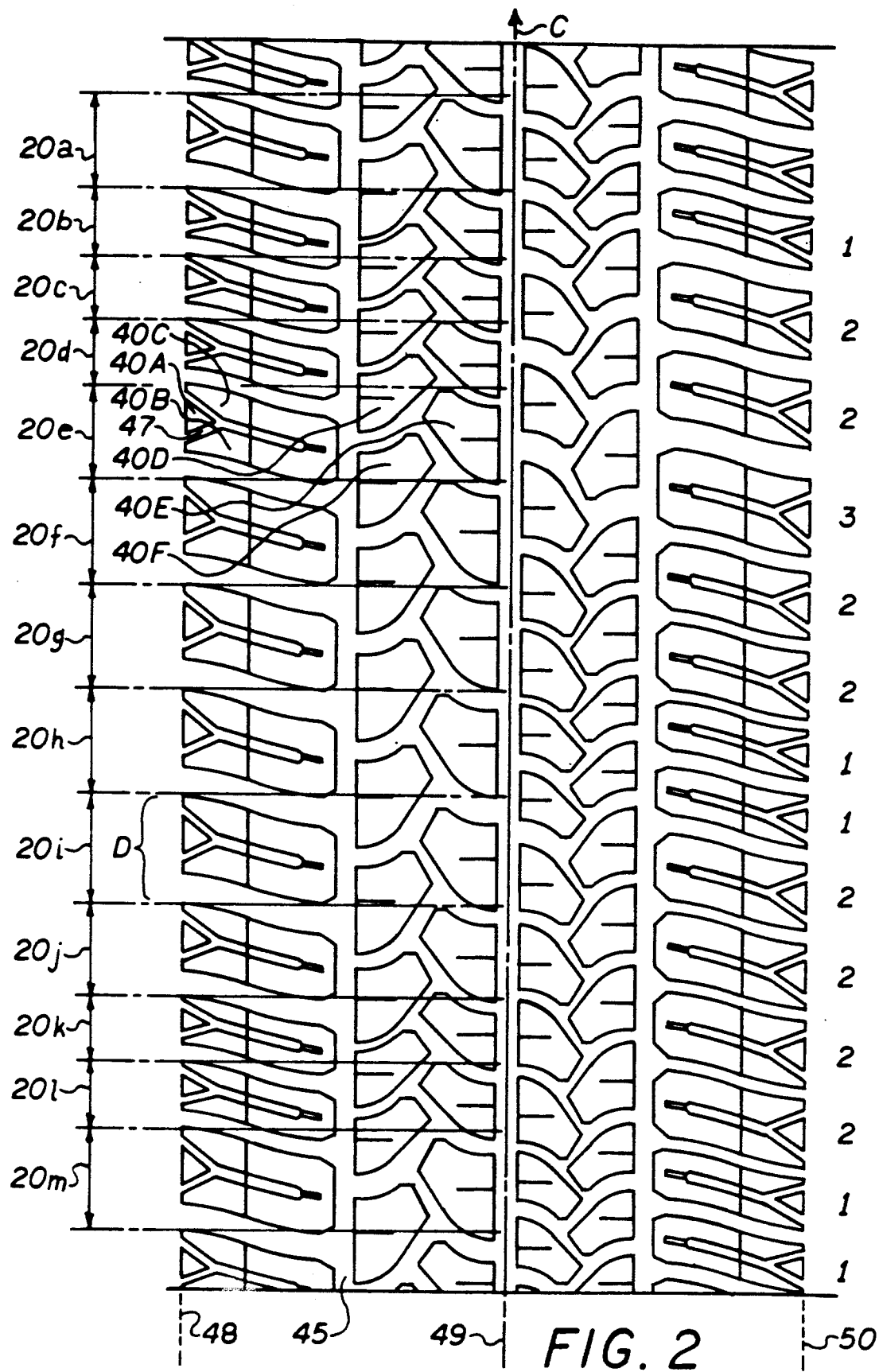
FIG. 2 is a schematic partial plan view of a block pattern of a tire tread made in accordance with the present invention.

As shown in FIG. 2, the tread 15 of the tire extends circumferentially around the tire and includes a plurality of base pitches, for example base pitches 20A-20H. Each base pitch 20A-20H preferably includes an arrangement of whole and/or partial load-supporting tread blocks. For example, base pitch 20E includes whole tread blocks 40A, 40B, and at least partially includes tread blocks 40C-40G.

The tread blocks are separated by circumferential and transverse grooves and/or sipes. For example, tread blocks 40A and 40B are separated by a circumferential groove 45, while tread blocks 40A and 40C are separated by a transverse groove 47. The transverse grooves can have a depth which typically varies across the width of the tire.

The width of the base pitches 20A-20H may also vary across the tire. For example, as illustrated in FIG. 2, the base pitches preferably extend transversely from the shoulder 48 to the center line 49 of the tire tread to form a bottom half 50, while additional base pitches extend from centerline 49 to the opposite shoulder 51 to form a top half 52. The bottom half 51 and the top half 52 are typically offset a selected amount in the circumferential direction "C" of the tire should be apparent to those skilled in the art. However, as indicated previously, each base pitch could also extend transversely across only a portion of the tire, for example across one circumferential section (or rib) of the tire, or across the entire width (i.e., from shoulder line 48 to opposite shoulder 51) of the tire.

The base pitches are repeated about the circumference of the tire to form the tire tread. The number of base pitches in the pitch sequence determines the pitch of the tire. For example, an 88-pitch tire typically has 88 base pitches spaced around the circumference of the tire. Other pitches can also be used, e.g., 61, 64, 67, etc. as will be known to those skilled in the art.

According to the present invention, the length "SP" of the base pitches in the circumferential direction "C" of the tire is selectively varied to reduce the noise of the tire on the road (i.e., to spread the harmonics over a wide frequency range) and to prevent cyclical harmonics from forming as the tire rotates.

In particular, the base pitches preferably have three different pitch lengths (i.e., small, medium and large) which form a pitch sequence around the circumference of the tire. The base pitches in the pitch sequence are arranged such that the transitions from small to large and from large to small base pitches is between about 15% and 30%, and preferably from 20% to 21% of the total number of transitions between pitches of different lengths. Further, the smallest and largest base pitches preferably each comprise about 35% to 40% of the total number of base pitches in the pitch sequence. These factors, when coupled with no more than three consecutive base pitches of the same length being arranged adjacent to one another around the circumference of the tire, provide a tire tread that produces less noise.

In any case, a pitch sequence determined according to the above technique can be placed around the circumference of the tire in one or more circumferential sections, wherein each circumferential section can comprise a whole or partial rib or ribs. For example, two or more pitch sequences can be arranged in separate circumferential sections according to a certain technique which is disclosed in co-pending application, Ser. No. 07/747,693 for "Multiple Pitch Sequence Optimization", filed Aug. 20, 1991.

Figure 3A:
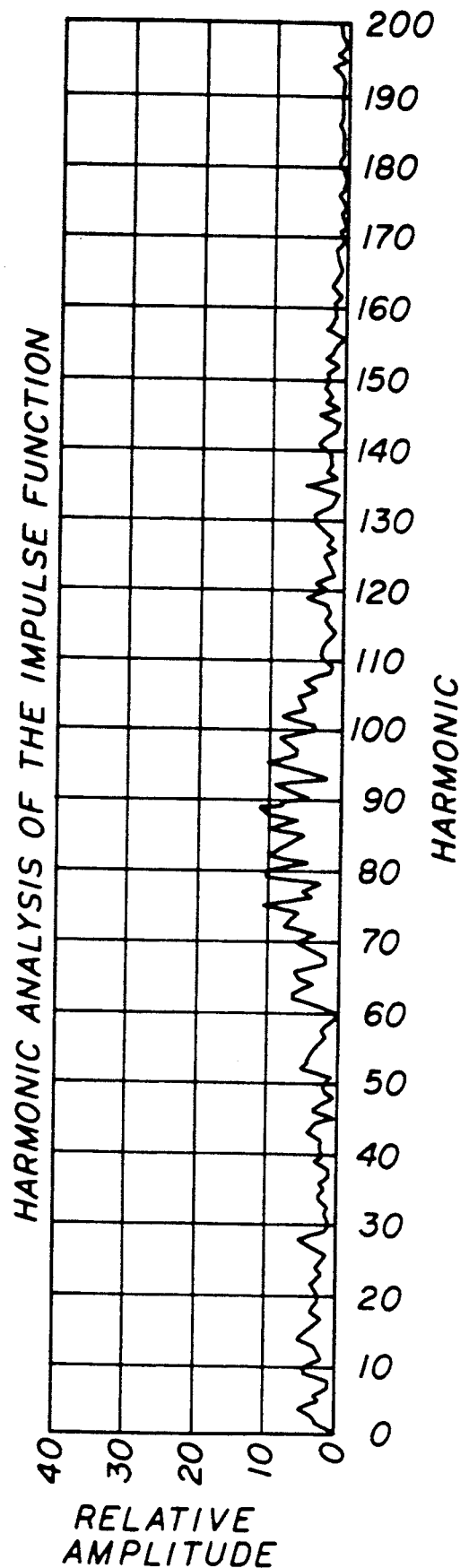
FIG. 3A is a graphical illustration of the Harmonic Analysis of the Impulse Function for a tire tread having three pitch lengths made in accordance with the present invention.
Figure 3B:
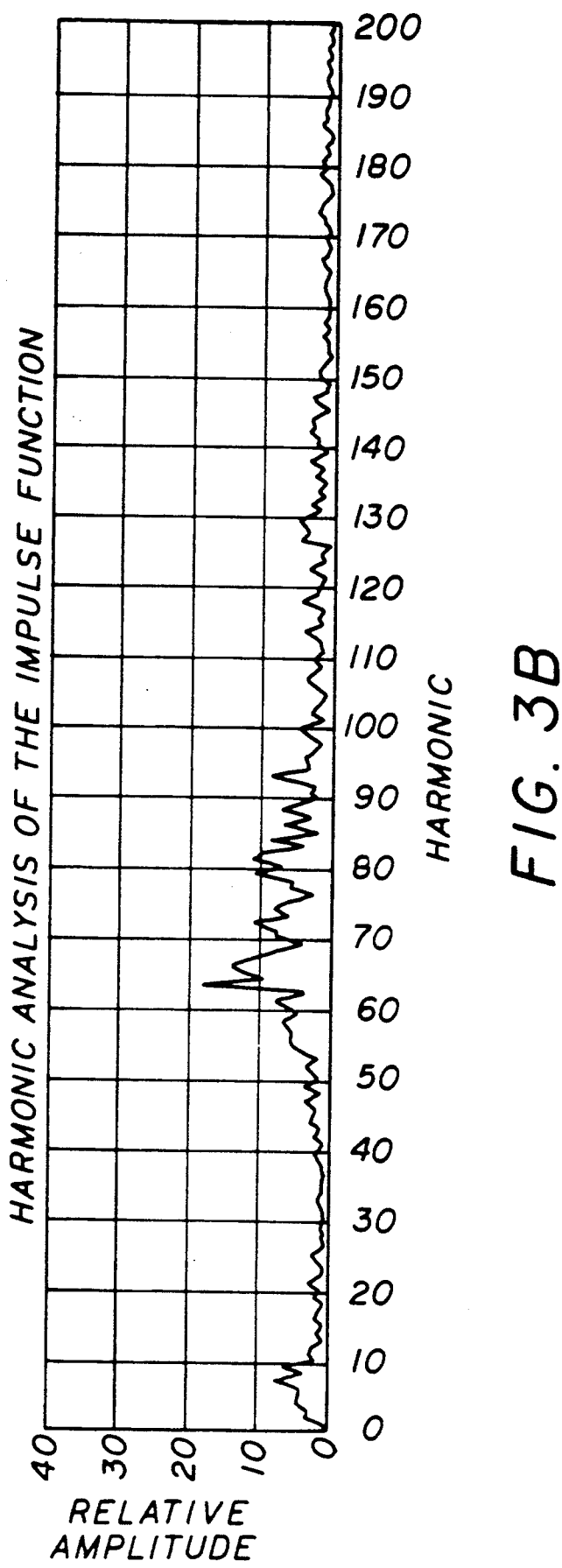
FIG. 3B is a graphical illustration of the Harmonic Analysis of the Impulse Function for a tire tread having three pitch lengths not made in accordance with the present invention.
Figure 4:
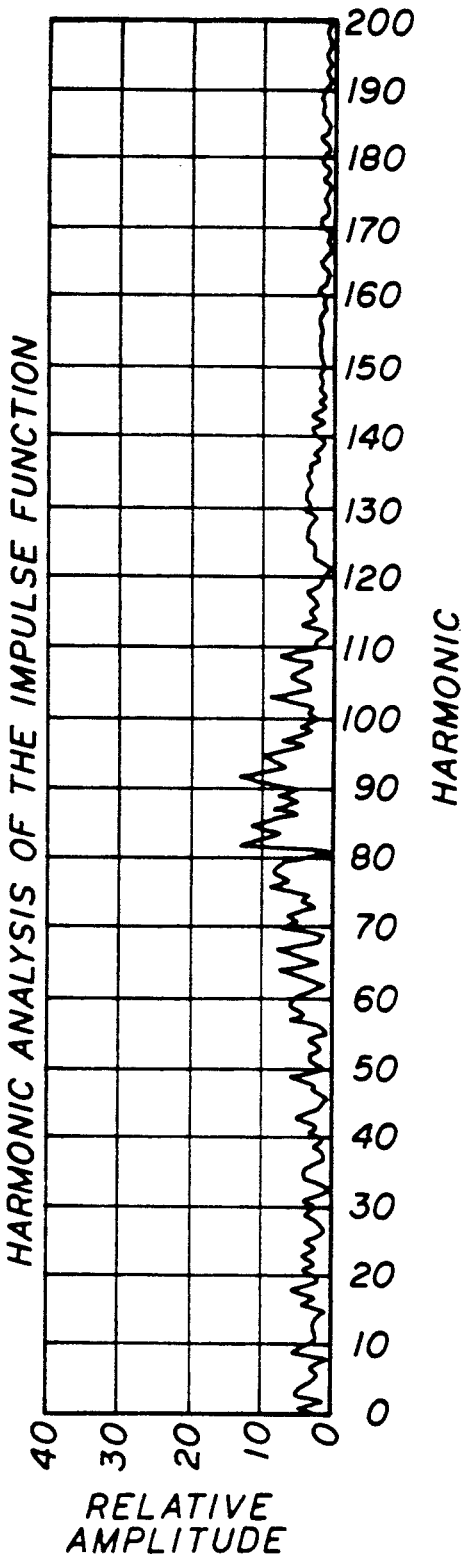

Computer simulation tests have been performed comparing the Harmonic Analysis of the Impulse Function of tire treads with pitch sequences arranged according to the above technique to tire treads where the pitch sequences were not arranged according to the above technique. A harmonic analysis for a Pitch Sequence arranged according to the inventive technique and is illustrated in FIG. 3A, while the Harmonic Analysis for a pitch sequence having the relative circumferential distances:
1232222111232221112233222111122223332211123322111223322 2111112222233333222, (i.e., not arranged according to the above technique) is illustrated in FIG. 3B. The Harmonic Analysis are plotted on an x-y coordinate system, where x represents the Harmonic and y represents the relative amplitude of the Impulse Function.

In comparing FIGS. 3A and 3B, it is seen that the impulse function for the tire tread where the pitch sequences are arranged according to the above technique in FIG. 3A has broader and flatter harmonic components than the pitch sequence in FIG. 3B. The broader and flatter harmonic components translate to reduced tire noise as the tire contacts the read surface. Accordingly, it has been determined that a tire tread having base pitches arranged according to the above technique has a reduction in tread noise as the tire contacts the road surface.

Accordingly, the present invention provides a technique for reducing tire noise which can be used on a wide variety of commercially available tires. Moreover, the invention provides a general technique which reduces tire noise for tires having base pitches with three or more pitch lengths which are selectively arranged in at least one circumferential section around the tire. However, with the present disclosure in mind, it is believed that obvious alternatives will become apparent to those of ordinary skill in the art.

What is claimed is:

1. A tire having a tread with a plurality of base pitches placed around the circumference of the tire, said plural base pitches having three different pitch lengths which define a preselected pitch sequence extending around the entire circumference of the tire, said base pitches being arranged in said pitch sequence such that the transitions between the base pitches with the smallest of said three different pitch lengths and the base pitches with the largest of said three different pitch lengths are between about 15% and 30% of the total number of transitions between base pitches of different lengths in the pitch sequence, the base pitches with the smallest and the largest pitch lengths each comprise at least 35% of the total number of base pitches around the circumference of the tire, and wherein not more than three base pitches having the same pitch length are adjacent each other around the circumference of the tire.

2. A tire as in claim 1, wherein the base pitches with the smallest and largest pitch lengths each comprise between 35% and 40% of the total number of base pitches around the circumference of the tire.

3. A tire having a thread with a plurality of base pitches placed around the circumference of the tire, said plural base pitches having three different pitch lengths arranged in a preselected pitch sequence, said base pitches being arranged in said pitch sequence such that the transitions between the base pitches with the smallest of said three different pitch lengths and the base pitches with the largest of said three different pitch lengths are between about 20% and 21% of the total number of transitions between base pitches of different lengths in the pitch sequence, wherein the base pitches with the smallest and the largest pitch lengths each comprise between 35% and 40% of the total number of base pitches around the circumference of the tire, and wherein the base pitches are arranged in said pitch sequence such that not more than three base pitches having the same pitch length are adjacent each other around the circumference of the tire.

4. A tire as in claim 3, wherein said pitch sequence is placed on at least one circumferential section of the tire.

5. A tire as in claim 4, wherein said pitch sequence is placed on more than one circumferential section of the tire.

* * * * *